UNITED STATES PATENT OFFICE.

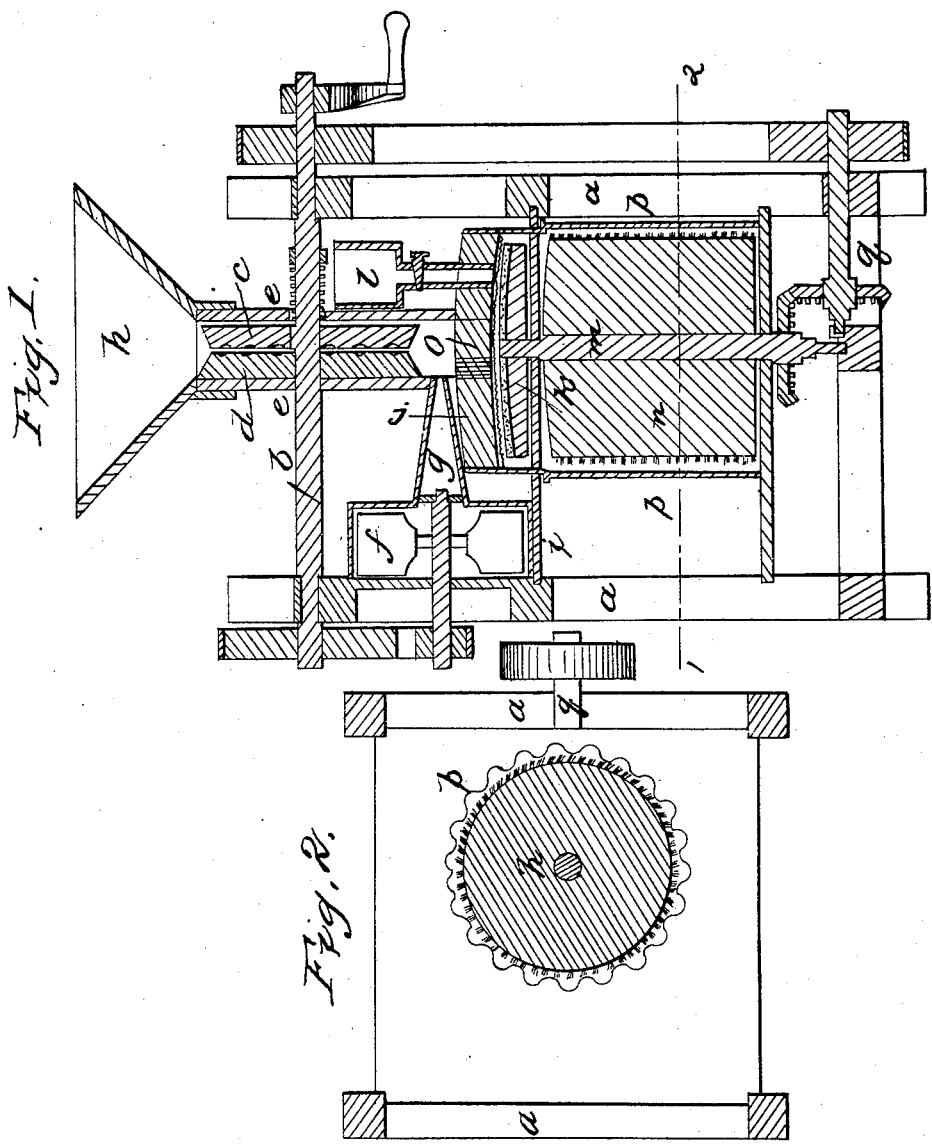

LEVI H. COLBORN, OF BALTIMORE, MARYLAND.

POLISHING RICE.

Specification of Letters Patent No. 23,449, dated April 5, 1859.

*To all whom it may concern:*

Be it known that I, LEVI H. COLBORN, of the city of Baltimore, in the State of Maryland, have invented a new and useful Mode of Cleaning or Polishing Rice; and I hereby declare that the following is a full, clear, and exact description thereof, reference being had to the accompanying drawings of a machine which will effect the same.

Figure 1 represents a vertical section of the machine through the center and Fig. 2 a horizontal section of Fig. 1 in the line 1—2.

The letters of reference indicate the same parts in both figures.

The processes heretofore used in hulling and cleaning rice have been to subject the rice, in a dried state, to attrition by various mechanical means. The following is a description of the machine represented and the process employed.

$a$ is a frame work consisting of four uprights with suitable cross pieces to support the several parts of the machine.

$b$, is a horizontal shaft having its bearings upon the upper cross piece of the frame. It carries a grooved vertical disk $c$, which with a similar concentric disk $d$, secured to the casing $e$, which incloses both, forms a mill, with which the outer covering of the rice can be broken. The disk, $c$, is kept up to $d$, with a yielding pressure which is given to it by a spiral spring, upon the shaft, a limited sliding motion being allowed to the disk within the casing. The paddy or crude rice enters the breaking mill from the hopper $n$, and as the rice and loosened hulls pass from between the disks, they are subjected to a blast created by the rapid revolution of the fan $f$, which separates the loose hulls from the mass, and draws them through the tube, $g$, into the fan case, whence they are discharged at $i$.

Below the breaking mill are placed two horizontal disks, the upper one $j$, being stationary and the lower one $k$, rotary; $j$, is slightly concave upon its lower side, which is faced in the present instance with sponge which is kept in a moist condition by water which flows through the disk in regulated quantities from the reservoir $l$, but one tube leading from the reservoir is shown, but more may be used. $k$, is convex upon its upper side to correspond with $j$, and is also faced with spongy material. This disk may be pressed up against $j$, with a yielding pressure, by a spring arranged in any convenient manner. $k$, receives a rotary motion from the vertical shaft $m$, upon the upper end of which it is fixed. The rice and the hulls which may not have been separated by the fan blast pass down from the breaking mill through the opening $o$, and thence between the wet spongy surfaces of the disks $j$ and $k$, receiving thus a regulated amount of mositure which loosens the closely adhering inner coating preparatory to the next part of the process which is to subject the rice to a moderate attrition for the purpose of thoroughly cleaning and polishing the rice. This is effected by a vertical drum $n$, fixed upon the shaft $m$, and covered with fine wool card or projecting bristles, or any other suitable brushing surface, revolving within, and nearly in contact with a corrugated or otherwise roughened concave $p$. The moistened rice falls from the periphery of the disk $k$, and passes between the drum $n$, and concave $p$. After being by attrition between them thoroughly divested of all its coverings, it may when dry be subjected to any suitable winnowing process.

Rotary motion is given to the various parts of the machine, above described, by power applied to the shaft $b$, and transmitted by pulleys and band to the horizontal shaft $q$, which by means of bevel gear, actuates the vertical shaft $m$. The fan blower also receives its rotary motion from the shaft $b$, by pulleys and band.

Instead of moistening the coverings of the rice with water I sometimes use spirits, which acts upon the inner coating, but not upon the rice itself. In this case the rice may be immersed without danger thereto, although water could not be so used, from the fact that after the outer hull had been removed it would immediately penetrate the body of the kernel and split it across in several places thus breaking it up and deteriorating its market value.

I have sometimes attempted to prepare the article by immersing the crude rice in water, and then passing it between frictional surfaces somewhat in the way that wheat and rye have been treated, in the process described in A. V. Newton's English patent of 22d August, 1848, (which I disclaim,) but the result has not been satisfactory, from the fact, that the moistening in this case is very irregular. Some kernels being moistened too much, break down into small parts by passing between the frictional surfaces, others have not the outer covering sufficiently broken to allow the moisture to loosen the inner coating, the grains passing through in an imperfectly polished state. Neither wheat nor rye are liable to these difficulties as their surfaces are always unbroken before being submitted to the hulling process, while in rice frequently portions of the outer covering will be broken before it is submitted to the process of cleaning.

Having thus fully described my process, what I claim as my invention and desire to secure by Letters Patent is—

The process of breaking the outer covering and moistening the inner coating of rice and polishing the same as herein set forth.

LEVI H. COLBORN.

In the presence of—
CHAS. EVERETT,
W. CROSSFIELD.